United States Patent [19]

Lanius

[11] Patent Number: 5,274,942
[45] Date of Patent: Jan. 4, 1994

[54] DECOY INCLUDING A MOVABLE HEAD

[75] Inventor: Charles A. Lanius, Prairie du Sac, Wis.

[73] Assignee: Flambeau Products Corporation, Middlefield, Ohio

[21] Appl. No.: 744,876

[22] Filed: Aug. 14, 1991

[51] Int. Cl.⁵ .................................. A01M 31/06
[52] U.S. Cl. .................................. 43/2; 43/3
[58] Field of Search .................................. 43/2, 3

[56] References Cited

U.S. PATENT DOCUMENTS

| | | |
|---|---|---|
| 1,468,979 | 9/1923 | Sherman et al. .................. 43/3 |
| 3,029,541 | 4/1962 | Palmer .................. 43/3 |
| 3,896,578 | 7/1975 | Franceschini .................. 43/3 |
| 4,073,397 | 2/1978 | Snodgrass .................. 43/3 |
| 4,876,820 | 10/1989 | Vann .................. 43/43.13 |
| 4,965,953 | 10/1990 | McKinney .................. 43/2 |

*Primary Examiner*—Paula A. Bradley
*Assistant Examiner*—James Miner
*Attorney, Agent, or Firm*—Michael, Best & Friedrich

[57] ABSTRACT

A decoy comprising a hollow body, a head pivotally joined to the body for selective pivotal movement with respect to the body about a generally horizontal pivot axis between a raised position and a lowered position, and a weight that is inside the body, that depends from the head, and that normally biases the head to the raised position.

21 Claims, 1 Drawing Sheet

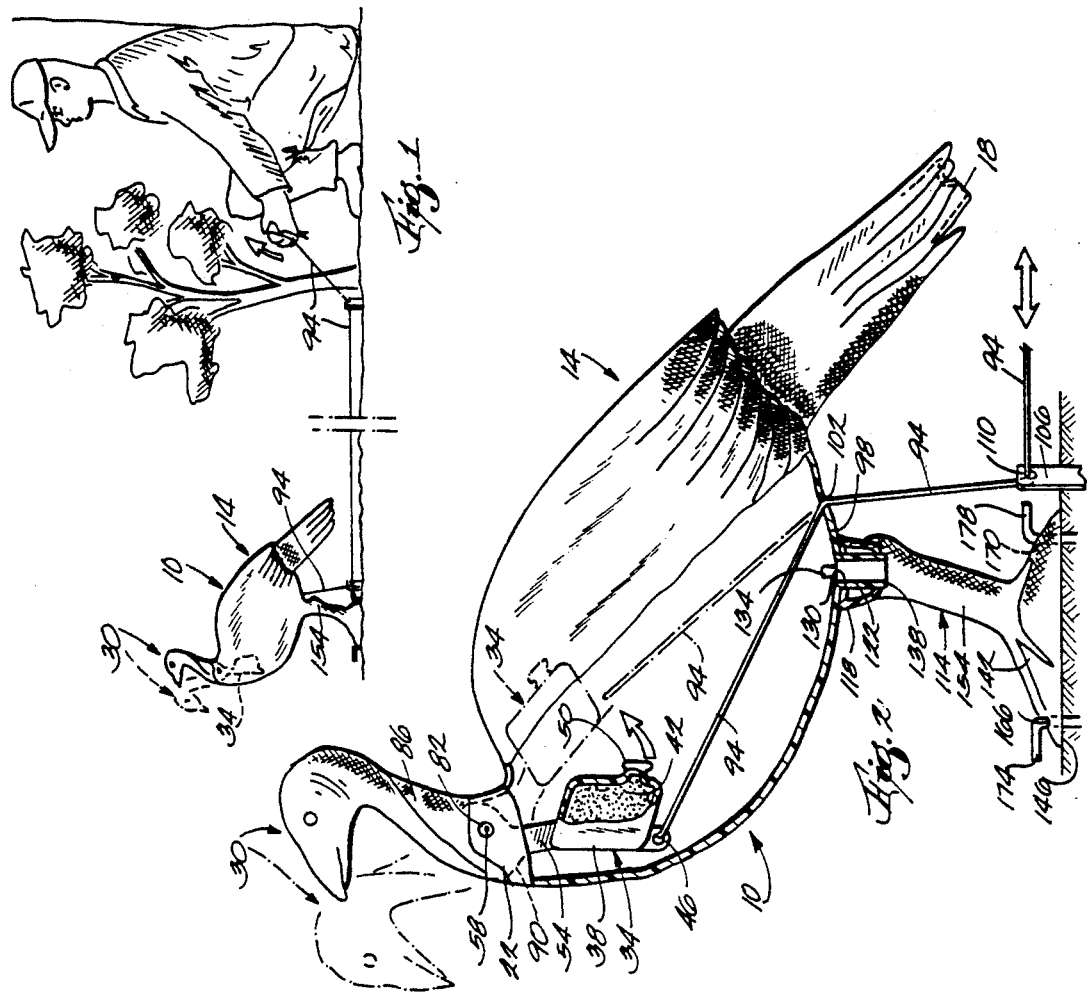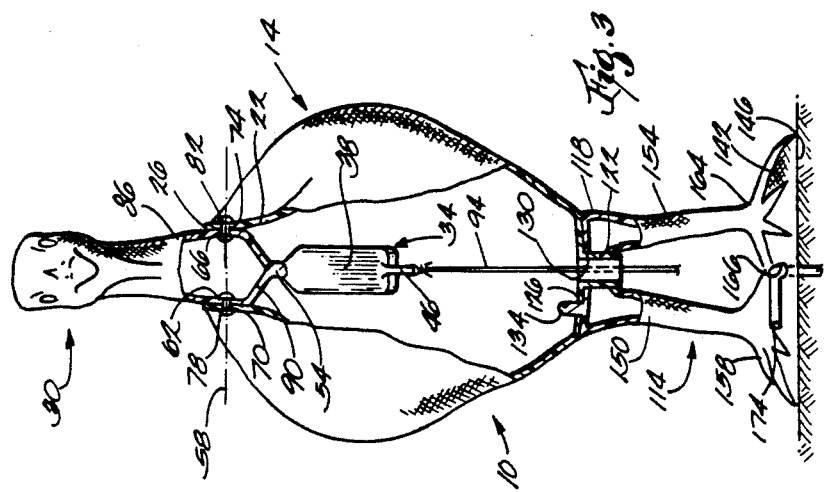

DECOY INCLUDING A MOVABLE HEAD

FIELD OF THE INVENTION

The present invention relates to decoys, and more particularly to fowl decoys, such as turkey decoys, including articulated portions or features providing for movement of portions of the decoy.

BACKGROUND OF THE INVENTION

A turkey decoy is illustrated in U.S. Pat. No. 4,339,887. Other decoys are illustrated in U.S. Pat. Nos. 4,658,530 and 4,885,861.

Attention is also directed to U.S. Pat. No. 2,663,108 illustrating a decoy having movable components. Other decoys including movable components or mechanisms for causing movement of the decoy are illustrated in U.S. Pat. No. 2,691,233; U.S. Pat. No. 2,793,456; U.S. Pat. No. 3,059,368; U.S. Pat. No. 3,350,808.

SUMMARY OF THE INVENTION

The present invention provides a decoy, such as a turkey decoy, including means for providing an effective simulated movement of the head of the decoy such that the decoy can be moved or controlled in a manner which closely simulates the manner of movement of a live bird in its natural environment. More particularly, the invention provides a decoy having a body and a head pivotally joined to the body such that the decoy head moves with respect to the body in a manner closely simulating the natural movement of the turkey.

More specifically, the decoy of the invention includes a body which can be supported by a pair of legs, and a head connected to the body so as to be pivotable about a horizontal axis. In one preferred form of the invention the decoy body is hollow and a lower end of the head extends into the hollow body. A portion of the head housed in the decoy body is weighted by a weight inside the body such that the head is normally biased to a raised or upright position.

Means are also provided for selectively causing pivotal movement of the head about the pivot axis in response to manipulation by an operator. In one embodiment of the invention the means for selectively causing movement includes a string or line having an end connected to a portion of the head such that tension on the line can cause downward movement of the decoy head to a lowered position. The decoy also includes an aperture in a lower portion of the body of the decoy which aperture permits the string or line to be attached to the weight and to extend downwardly from the decoy through the hole. The line can extend through guides to a remote location or position of the hunter. In operation, the hunter can pull on the line to cause downward movement of the decoy head to simulate movement of the head. When tension on the line is released the weight on the lower end of the decoy head will cause the head to return to the raised position and in a manner which simulates the natural movement of a turkey.

An advantage of the invention is that both the head and the body of the decoy can be blow-molded.

Other features and advantages of the invention will become apparent to one of ordinary skill in the art upon review of the following detailed description of the preferred embodiment of the invention, reference being made to the appended drawings.

BRIEF DESCRIPTION OF THE DRAWINGS

FIG. 1 is an elevation view of a decoy embodying the invention.

FIG. 2 is an enlarged view of the decoy shown in FIG. 1 and with portions broken away.

FIG. 3 is an end view of the decoy illustrated in FIG. 2 and with portions broken away.

DETAILED DESCRIPTION OF THE PREFERRED EMBODIMENT OF THE INVENTION

Shown in FIG. 1 is a decoy 10 embodying the invention. In the specific embodiment illustrated in the drawing, the decoy 10 is configured to have the appearance of a turkey. The decoy 10 could be alternatively configured to have the appearance of a goose, a hen, another type of fowl or another type of animal.

The decoy 10 comprises a hollow body 14. In the illustrated embodiment, the body 14 is blow molded via a blow tube 18, which blow tube 18 is cut after the body 14 is blow molded. The body 14 has an upwardly and forwardly extending portion 22 defining an annular opening 26.

The decoy 10 further comprises a head 30. In the illustrated embodiment, the head 30 is hollow. More particularly, in the illustrated embodiment, the head 30 is blow molded.

The decoy 10 further includes a weight 34 depending from the head 30 and fixed to the head 30 such that there is no relative movement between the head 30 and the weight 34.

The weight 34 includes a pod or receptacle 38, and ballast 42 in the receptacle 38. In the illustrated embodiment, the ballast 42 comprises sand. The receptacle 38 includes a forward, lower, apertured portion 46; a lower, rear sealed portion 50; and a forward upper pinch sealed portion 54 at an interface of the head 30 and the weight 34. The head 30 and the receptacle 38 may be integrally formed. Further, the head 30 and the receptacle 38 may be integrally formed by blow molding.

During assembly, the weight 34 and a portion of the head 30 are inserted into the opening 26, and the head 30 is then pivotally joined to the body 14 for selective pivotal movement with respect to the body 14 about a generally horizontal pivot axis 58 between a raised position, illustrated in solid outline, and a lowered position, illustrated in dashed outline. More particularly, in the illustrated embodiment, the head 30 is pivotally joined to the body 14 at two horizontally spaced pivot points for pivotal movement about the generally horizontal pivot axis 58. In the illustrated embodiment, the head 30 has first and second horizontally spaced apertures 62 and 66, respectively, the upwardly and forwardly extending portion 22 of the body 14 has horizontally spaced apertures 70 and 74, respectively, and the decoy includes a pin 78 joining the head 30 to the body 14, via the apertures 62 and 70, and the decoy includes a pin 82 pivotally joining the head 30 to the body 14 via the apertures 74 and 66. In the illustrated embodiment, the pins 78 and 82 are metal barbed pins. Optionally, instead of the metal barbed pins, nylon or plastic pins could be employed.

After assembly, the head 30 has an upper end 86 projecting from the body 14 and a lower end 90 housed in the body 14, and the weight 34 depends from the lower end 90 of the head 30 and is movable in the body 14. The weight 34 is movable between an upper and rearward position, shown in dashed outline, and a lower and forward position, shown in solid outline. The weight 34 moves with the head 30 and the upper and rearward position of the weight 34 corresponds to the lowered position of the head 30. Similarly, the lower and forward position of the weight 34 corresponds to the raised position of the head 30. The weight 34 normally biases the head 30 to the raised position.

The decoy further comprises user operable means for overcoming the bias of the weight 34 and pivoting the head 30 to the lowered position. In the illustrated embodiment, the overcoming means includes a line or string 94 that extends into the body 14 from outside the body 14 and that is connected to the forward, lower, apertured portion 46 of the weight 34. In the illustrated embodiment, the body 14 has a central bottom portion 98 that includes an aperture 102, and the line 94 extends from outside the body 14 to inside the body 14 through the aperture 102. In the illustrated embodiment, the aperture 102 is formed by molding the body 14 such that it includes a projection extending downwardly from the rest of the body 14, and by later cutting off the projection.

The decoy may be supported on the ground, and the decoy further includes guide means for positioning a portion of the line 94 with respect to the ground supporting the decoy 10. In the illustrated embodiment, the guide means comprises a stake 106 that, when the decoy is in use, is selectively driven into the ground, preferably close to a point directly under the aperture 102. The stake 106 has a guide portion 110, defined by an aperture through the stake 106 and a slit leading to the aperture, which guide portion 110 is located above the ground when the stake 106 is driven into the ground.

The decoy 10 further includes at least one leg removably attached to the body 14 and adapted to support the body 14 from the ground in spaced relation to the ground. More particularly, in the illustrated embodiment, the decoy 10 includes a leg assembly 114 having an upper portion 118 removably attached to the body 14. Still more particularly, in the illustrated embodiment, the body 14 includes a central downwardly extending projection 122, and the body 14 includes an aperture 126 spaced laterally from the projection; and the upper portion 118 has a central aperture 130 selectively receiving the central projection 122 in close surrounding fashion, and the upper portion 118 has an upwardly extending projection spaced from the central aperture 130 and selectively housed in the aperture 126 in close surrounding fashion when the central projection 122 is received in the central aperture 130. The central projection 122 has a circumference that is substantially larger than the circumference of the projection 134. The projection 134 and aperture 126 prevent rotation of the body 14 relative to the leg assembly 114.

In the illustrated embodiment, the aperture 126 is formed by drilling, and the projection 122 is formed during the blow molding by blow molding a downwardly extending projection, and then cutting off a portion of the projection below a point 138. The decoy 10 could be used without legs, in which case the portion of the projection below the point 138 need not be cut off. The leg assembly 114 further includes a lower mound shaped portion 142. The mound shaped portion 142 has a planar bottom surface 146 for placement on the ground. The leg assembly further includes two legs 150 and 154, respectively, extending between and integral with the upper portion 118 and the lower mound shaped portion 142. Each of the legs 150 and 154 includes a foot shaped portion 158 and 164, respectively, on the mound shaped portion 142. An aperture 166 is defined vertically through the mound shaped portion 142 generally forwardly of the legs 150 and 154, and an aperture 170 is defined vertically through the mound shaped portion 142 generally rearwardly of the legs 150 and 154. In the preferred embodiment, the apertures 166 and 170 are formed by drilling through the mound shaped portion 142.

The decoy 10 further includes first and second generally L-shaped fastening stakes 174 and 178, respectively. The first and second fastening stakes 174 and 178 are selectively driven into the ground through the apertures 166 and 170, respectively, so as to secure the decoy 10 against horizontal sliding movement and against tipping when the string or line 94 is pulled by a user to cause movement of the head 30.

While a preferred embodiment of the invention has been disclosed, various obvious modifications will become apparent to one of ordinary skill in the art. Thus, the scope of the invention is to be limited only by the spirit and scope of the following claims.

I claim:

1. A decoy comprising:
   a hollow body;
   a head pivotally joined to the body for selective pivotal movement with respect to the body about a generally horizontal pivot axis between a raised position and a lowered position; and
   a weight which is inside the body when the head is in the raised position and when the head is in the lowered position, which weight depends from the head, and which weight is primarily responsible for pivoting the head to the raised position when the head pivots from the lowered position to the raised position.

2. A decoy as set forth in claim 1 and further comprising user operable means for overcoming the bias of the weight and pivoting the head to the lowered position, the overcoming means including a line which extends into the body from outside the body, when the head is in the raised position and when the head is in the lowered position, and which line is attached directly to the weight.

3. A decoy as set forth in claim 2 wherein the body portion further includes an aperture, and wherein the line extends from outside the body to inside the body through the aperture.

4. A decoy as set forth in claim 3 wherein the aperture is formed in a central bottom portion of the body.

5. A decoy as set forth in claim 3 wherein the decoy is adapted to be supported on ground, and wherein the decoy further includes guide means for positioning a portion of the line with respect to the ground supporting the decoy.

6. A decoy as set forth in claim 1 wherein the decoy is a turkey decoy.

7. A decoy as set forth in claim 1 wherein the body is adapted to be supported on ground, and wherein the decoy further comprises at least one leg removably attached to the body and adapted to support the body from the ground in spaced relation to the ground.

8. A decoy as set forth in claim 1 wherein the head has an upper end projecting from the body and a lower end housed in the body and movable in the body, and wherein the weight depends from the lower end of the head.

9. A decoy as set forth in claim 1 wherein the head is hollow.

10. A decoy as set forth in claim 9 wherein the head is pivotally joined to the body at two horizontally spaced pivot points for pivotal movement about the generally horizontal pivot axis.

11. A decoy as set forth in claim 1 wherein the body is blow-molded.

12. A decoy as set forth in claim 11 wherein the head is blow-molded.

13. A decoy comprising:
a hollow body;
a head pivotally joined to the body for selective pivotal movement with respect to the body about a generally horizontal pivot axis between a raised position and a lowered position, the head having an upper end projecting from the body and having a lower end housed in the body and movable in the body;
a weight which is entirely inside the body when the head is in the raised position and when the head is in the lowered position, which weight depends from the lower end of the head, and which weight normally biases the head to the raised position; and
user operable means for overcoming the bias of the weight and pivoting the head to the lowered position, the overcoming means including a line which extends into the body from outside the body, when the head is in the raised position and when the head is in the lowered position, which line is attached directly to the weight and which line moves the weight to effect pivoting of the head to the lowered position.

14. A decoy as set forth in claim 13 wherein the body portion further includes an aperture, and wherein the line extends from outside the body to inside the body through the aperture.

15. A decoy as set forth in claim 14 wherein the decoy is adapted to be supported on ground, and wherein the decoy further includes guide means for positioning a portion of the line with respect to the ground supporting the decoy.

16. A decoy as set forth in claim 13 wherein the body is adapted to be supported on ground, and wherein the decoy further comprises at least one leg removably attached to the body and adapted to support the body from the ground in spaced relation to the ground.

17. A decoy as set forth in claim 13 wherein the head is hollow.

18. A decoy as set forth in claim 17 wherein the head is pivotally joined to the body at two horizontally spaced pivot points for pivotal movement about the generally horizontal pivot axis.

19. A decoy as set forth in claim 13 wherein the body is blow-molded.

20. A decoy comprising:
a blow-molded plastic hollow body;
a blow-molded plastic head pivotally joined to the body at two horizontally spaced pivot points for selective pivotal movement with respect to the body about a generally horizontal pivot axis between a raised position and a lowered position, the head having an upper end projecting from the body and having a lower end housed in the body and movable in the body;
a weight which is inside the body when the head is in the raised position and when the head is in the lowered position, which weight depends from the lower end of the head, and which weight biases the head to the raised position, at least a portion of the weight being blow molded and being integral with the head; and
user operable means for overcoming the bias of the weight and pivoting the head to the lowered position, the overcoming means including a line that extends into the body from outside the body, that is attached directly to the weight inside the body, and that moves the weight to effect pivoting of the head to the lowered position.

21. A decoy comprising:
a hollow body;
a hollow head pivotally joined to the body at two horizontally spaced pivot points for selective pivotal movement with respect to the body about a generally horizontal pivot axis between a raised position and a lowered position, the head having an upper end projecting from the body and having a lower end housed in the body and movable in the body;
a weight which is inside the body when the head is in the raised position and when the head is in the lowered position, which weight depends from the lower end of the head, which weight biases the head to the raised position, which weight comprises a hollow receptacle integral with the head, and which weight further comprises ballast in the receptacle; and
user operable means for overcoming the bias of the weight and pivoting the head to the lowered position, the overcoming means including a line that extends into the body from outside the body, that is attached directly to the weight inside the body, and that moves the weight to effect pivoting of the head to the lowered position.

* * * * *